UNITED STATES PATENT OFFICE.

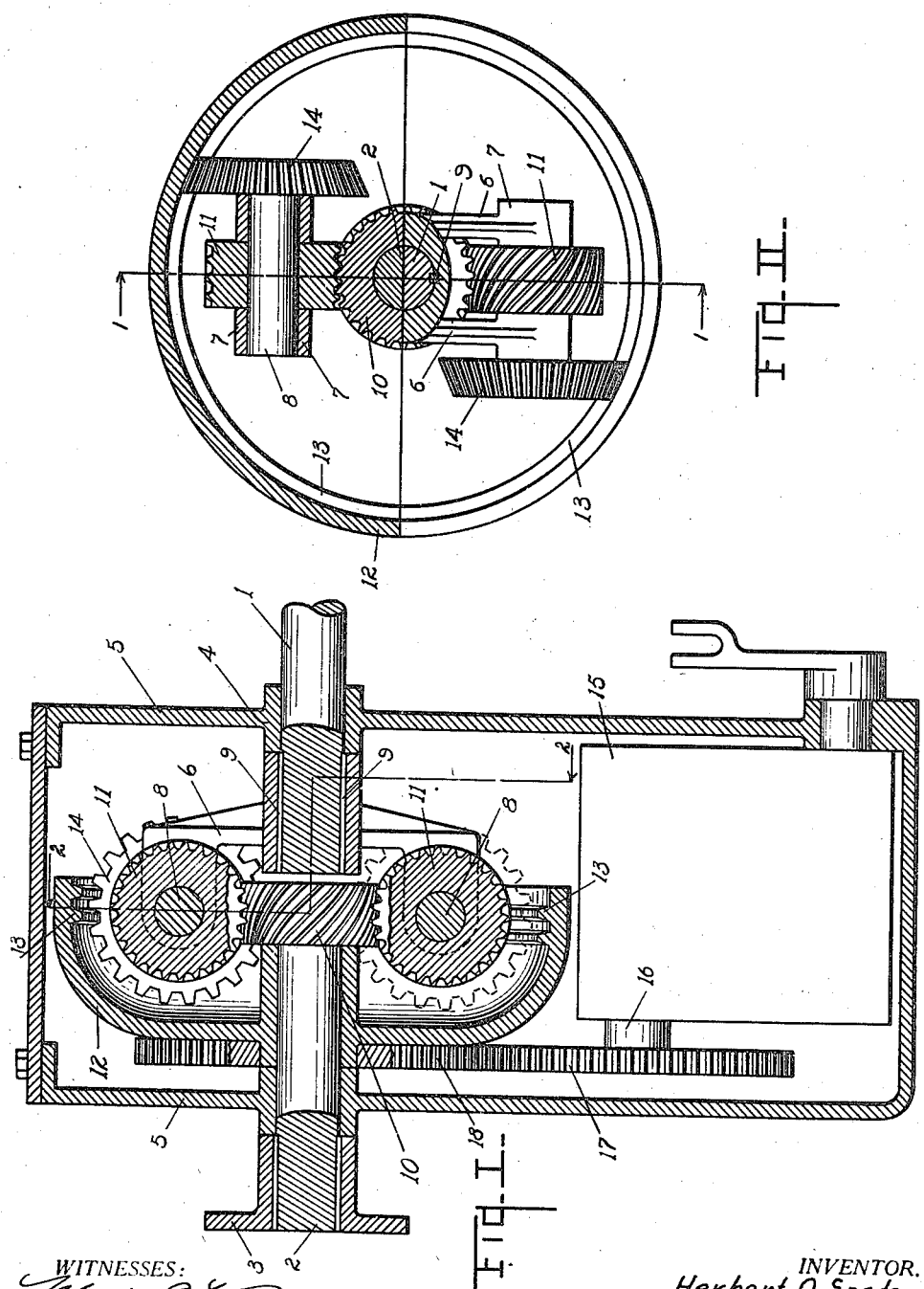

HERBERT O. SPADE, OF FLINT, MICHIGAN.

VARIABLE-SPEED GEARING.

1,261,312.         Specification of Letters Patent.         Patented Apr. 2, 1918.

Application filed September 15, 1916. Serial No. 120,385.

*To all whom it may concern:*

Be it known that I, HERBERT O. SPADE, a citizen of the United States, residing at Flint, county of Genesee, State of Michigan, have invented certain new and useful Improvements in Variable-Speed Gearing, of which the following is a specification.

This invention relates to improvements in variable speed gearing.

My improved variable speed gearing is especially designed by me for use as a transmission for motor vehicles although it is desirable and may be readily adapted for use in other relations such as lathes and machine tools and in combinations where variation of speed is desired.

The main objects of this invention are:

First, to provide an improved variable speed gearing of the gear type by which any speed may be secured from the maximum or direct high speed to a complete stop.

Second, to provide an improved variable speed gearing having these advantages which is very compact and simple in structure.

Third, to provide an improved variable speed gearing which is also adapted as a stop or brake means.

Fourth, to provide an improved variable speed gearing which is very easily controlled or adjusted to secure the various speeds.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail view, mainly in longitudinal section on a line corresponding to line 1—1 of Fig. II, of a structure embodying my invention.

Fig. II is a detail transverse section on a line corresponding to the broken line 2—2 of Fig. I.

In the accompanying drawing I have not attempted to show the parts in their exact proportions or dimensions and certain parts are shown conventionally.

In the drawing similar reference characters refer to similar parts throughout the several views.

Referring to the drawing, 1 is the driving shaft and 2 the driven shaft. The driven shaft is provided with a flange 3 for the attachment of the propeller shaft of an automobile or other part to be driven. The shafts are arranged in alinement, their adjacent ends being supported by the bearings 4 in the gear box 5. The gear box and bearings are shown conventionally.

On the driving shaft I mount a planetary support member 6 provided with bearings 7 for the planetary shafts 8, which are arranged transversely of the driving and driven shafts. The support 6 is secured to the driving shaft to revolve therewith by means of the feathers or keys 9.

To the driven shaft 2 I secure a spiral gear 10. On the planetary shafts 8 are spiral gears 11 meshing with the gear 10. The shell-like control member 12 is sleeved upon or revolves upon the driven shaft 2 to embrace the planetary shafts and gears. The control member is provided with an internal spiral gear 13 and is connected to the planetary shaft by the gears 14, the teeth of which are adapted to mesh with the spiral control gear 13. The pitch of the control gear teeth is such that they coact with the gears 14 to constitute an automatic locking means so that when the control member 12 is free to rotate it is automatically locked to and rotates with the planetary gear so that the parts rotate as a unit, thus securing high speed or direct drive. Little power is required, however, to retard or hold the control member 12, and when so held, or controlled that its revolutions are less than that of the driving shaft, the driven shaft is driven at a reduced speed, and if the control member be held against revolution the entire gearing is locked or, in other words, it comes to a stop, so that the mechanism may be used as a brake or stop means. This is of particular advantage where the mechanism is used on lathes and like machine tools where the quick stopping of the drive is desirable to facilitate rapid work.

I preferably control the control member by means of an oil pump 15, shown conventionally in Fig. I, the shaft 16 which is controlled by the pump is connected by gears 17 and 18 to the control member 12.

By utilizing an oil pump as a control means the speed at which the control member revolves may be regulated or controlled so that any speed may be secured from the maximum to a full stop, the variation of speed being rapid or slow according to the manipulation of the control means.

While my improved variable speed mechanism is especially adapted for use in automobile or motor vehicle drives it is readily adapted and is desirable for use in other relations.

If, desired, the pitch of the control gear may be such as to secure a complete reversal or reverse drive for the driven shaft, thus adapting the structure not only as a variable speed but also as a reversing gearing.

The structure illustrated is not designed to secure the reversing. As such reversing action may be secured merely by changing of the pitch of the control member, I have not illustrated the same herein as such details will be readily understood by those skilled in the art from the disclosure made.

The relative number of teeth in the gears 10, 11 and 14 determine the variation in speed for a given variation between the driving member and the control member.

I have illustrated and described my improvements in an embodiment which will, I believe, enable a complete understanding of my invention and enable its application to various relations for which it is adapted, and I have not, therefore, attempted to illustrate or describe such adaptations or certain modifications in structural features which I contemplate.

Having thus described my invention, what I claim as new and desire to secure by Letters Patent, is:

1. In a variable speed gearing, the combination of driving and driven shafts disposed in alinement, a planetary support member on said driving shaft, planetary gear shafts mounted on said support member transversely of said driving and driven shafts, a spiral gear on said driven shaft, spiral planetary gears on said planetary shafts meshing with said gear on said driven shaft, a control member sleeved upon said driven shaft to embrace said planetary shafts and gears, an internal spiral gear on said control member, planetary control gears on said planetary shafts meshing with said control member gear, said control member and planetary control gears constituting an automatic planetary locking means when said control member is free to rotate whereby the parts rotate as a unit, and control means for said control member adapted to control its revolutions at any speed less than said driving shaft or to permit it to revolve with said driving shaft.

2. In a variable speed gearing, the combination of driving and driven shafts disposed in alinement, a planetary support member on said driving shaft, planetary gear shafts mounted on said support member transversely of said driving and driven shafts, a spiral gear on said driven shaft, spiral planetary gears on said planetary shafts meshing with said gear on said driven shaft, a control member sleeved upon said driven shaft to embrace said planetary shafts and gears, an internal spiral gear on said control member, planetary control gears on said planetary shafts meshing with said control member gear, said control member and planetary control gears constituting an automatic planetary locking means when said control member is free to rotate whereby the parts rotate as a unit.

3. In a variable speed gearing, the combination of driving and driven shafts disposed in alinement, a planetary support member on said driving shaft, planetary gear shafts mounted on said support member transversely of said driving and driven shafts, a spiral gear on said driven shaft, spiral planetary gears on said planetary shafts meshing with said gear on said driven shaft, a control member sleeved upon said driven shaft to embrace said planetary shafts and gears, an internal spiral gear on said control member, planetary control gears on said planetary shafts meshing with said control member gear.

4. In a variable speed gearing, the combination of driving and driven shafts, a planetary support member on said driving shaft, a gear on said driving shaft, planetary gear shafts mounted on said support member, planetary gears on said planetary shafts meshing with said gear on said driven shaft, a control member provided with an internal gear, gears on said planetary shafts meshing with said control member gear and coacting therewith to provide an automatic planetary locking means when said control member is free to rotate whereby the parts rotate as a unit, and control means for said control member adapted to control its revolutions or to permit it to revolve with said driving shaft.

5. In a variable speed gearing, the combination of driving and driven shafts, a planetary support member on said driving shaft, a gear on said driving shaft, planetary gear shafts mounted on said support member, planetary gears on said planetary shafts meshing with said gear on said driven shaft, a control member provided with an internal gear, gears on said planetary shafts meshing with said control member gear and coacting therewith to provide an automatic planetary locking means when said control member is free to rotate whereby the parts rotate as a unit, and control means for said control member.

6. In a variable speed gearing, the combination of driving and driven shafts, a planetary support member on said driving shaft, a gear on said driven shaft, planetary gear shafts mounted on said support member, planetary gears on said planetary shafts meshing with said gear on said driven shaft, a control member provided with an internal gear, gears on said planetary shafts meshing with said control member gear, and control means for said control member adapted to control its revolutions or to permit it to revolve with said driving shaft.

7. In a variable speed gearing, the combination of driving and driven members, a spiral gear on said driven member, a planetary gear shaft mounted on said driving member, a spiral planetary gear on said planetary shaft meshing with said gear on said driven member, a control member provided with an internal spiral gear, a gear on said planetary shaft meshing with said control member gear, said control member and coacting gear constituting an automatic planetary locking means when said control member is free to rotate whereby the parts rotate as a unit, and control means for said control member adapted to control its revolutions at any speed less than said driving member or to permit it to revolve with said driven member.

8. In a variable speed gearing, the combination of driving and driven members, a spiral gear on said driven member, a planetary gear shaft mounted on said driving member, a spiral planetary gear on said planetary shaft meshing with said gear on said driven member, a control member provided with an internal spiral gear, a gear on said planetary shaft meshing with said control member gear, said control member and coacting gear constituting an automatic planetary locking means when said control member is free to rotate whereby the parts rotate as a unit, and control means for said control member.

9. In a variable speed gearing, the combination of driving and driven members, a spiral gear on said driven member, a planetary gear shaft mounted on said driving member, a spiral planetary gear on said planetary shaft meshing with said gear on said driven member, a control member provided with an internal spiral gear, a gear on said planetary shaft meshing with said control member gear, and control means for said control member adapted to control its revolutions at any speed less than said driving member or to permit it to revolve with said driven member.

10. In a variable speed gearing, the combination of driving and driven members, a spiral gear on said driven member, a planetary gear shaft mounted on said driving member, a spiral planetary gear on said planetary shaft meshing with said gear on said driven member, a control member provided with an internal spiral gear, a gear on said planetary shaft meshing with said control member gear, and control means for said control member.

11. In a variable speed gearing, the combination of driving and driven members, a gear on said driven member, a planetary gear shaft mounted on said driving member, a planetary gear on said planetary shaft meshing with said gear on said driven member, a control member geared to said planetary shaft, the gear connections constituting an automatic planetary locking means when said control member is free to rotate whereby the parts rotate as a unit, and control means for said control member adapted to control its revolutions or to permit it to revolve with said driven member.

12. In a variable speed gearing, the combination of driving and driven members, a gear on said driven member, a planetary gear shaft mounted on said driving member, a planetary gear on said planetary shaft meshing with said gear on said driven member, a control member rotatable independently of said driving member for locking said planetary gear against rotation relative to its own axis, and control means for actuating said control member to permit said planetary gear to rotate at various speeds.

13. In a variable speed gearing, the combination of driving and driven members, a gear on said driven member, a planetary gear shaft mounted on said driving member, a planetary gear on said planetary shaft meshing with said gear on said driven member, a control member geared to said planetary shaft, the gear connections constituting an automatic planetary locking means when said control member is free to rotate whereby the parts rotate as a unit, and control means for said control member.

14. In a variable speed gearing, the combination of driving and driven members, a planetary shaft mounted on said driving member and having driving connections to said driven member, an internal spiral control gear, a gear on said planetary shaft meshing with said control gear and coacting therewith to provide locking means when said control gear is free to rotate whereby the parts rotate as a unit, and control means for controlling said control gear.

15. In a combination of the class described, a driving shaft, a driven member, a planetary shaft extending transversely of said driving shaft and bodily carried thereby, a geared connection between said planetary shaft and said driven shaft, means for locking said planetary shaft against rotation about its axis, and means for controlling said locking means to permit said planetary shaft to rotate at various speeds, substantially as described.

16. In a structure of the class described, the combination of a driving shaft, a driven member, a gear on said driven member, a planetary gear shaft carried by said driving shaft, a gear on said planetary shaft meshing with said gear on said driven member, and means independent of said driving shaft for gradually changing the speed of axial revolution of said planetary shaft, substantially as described.

In witness whereof, I have hereunto set my hand and seal in the presence of two witnesses.

HERBERT O. SPADE. [L. S.]

Witnesses:
TRENT BOWLES,
FRANK A. GREEN.